United States Patent [19]

Fishler et al.

[11] Patent Number: 4,996,276

[45] Date of Patent: Feb. 26, 1991

[54] PROCESS FOR THE POLYMERIZATION OF PENTABROMOBENZYLESTER MONOACRYLATE

[76] Inventors: Theodor-Morel Fishler, 29 Oren Street, Haifa; Michael Peled, 17 Hatzav Street, Beer Sheva; Leonard M. Shorr, 39 Palmach Street, Haifa, all of Israel

[21] Appl. No.: 359,997

[22] Filed: Jun. 1, 1989

[30] Foreign Application Priority Data

Jun. 2, 1988 [IL] Israel ........................................ 86605

[51] Int. Cl.$^5$ .............................................. C08F 18/20
[52] U.S. Cl. ................................................ 526/2927.5
[58] Field of Search ...................................... 526/292.5

[56] References Cited

U.S. PATENT DOCUMENTS 4,110,296  8/1978  Wang ................................ 526/292.5
4,128,709  12/1978  Vollkommer et al. .......... 526/292.5

Primary Examiner—Bernard Lipman
Attorney, Agent, or Firm—Michael N. Meller

[57] ABSTRACT

A process is described, in which poly(pentabromobenzylester acrylate) is prepared by the thermal bulk polymerization of pentabromobenzylester monoacrylate.

A product with excellent properties is obtained with short reaction times and without any additive.

5 Claims, No Drawings

PROCESS FOR THE POLYMERIZATION OF PENTABROMOBENZYLESTER MONOACRYLATE

FIELD OF THE INVENTION

The present invention relates to a process for the thermal bulk polymerization of pentabromobenzylester monoacrylate. Particularly, the invention relates to the flash polymerization and copolymerization of pentabromobenzylester monoacrylate.

BACKGROUND OF THE INVENTION

Pentabromobenzylester monoacrylate, hereinafter called PBB-MA for the sake of brevity, is the monomer from which poly(pentabromobenzylester acrylate) (PBB-PA) is prepared. PBB-PA is known in the art to possess flame retardant properties and is known to render otherwise flammable synthetic resins flame-resistant. The process for the preparation of PBB-PA according to the known art is disclosed, e.g., in DE 25 27 802, and presents several serious drawbacks. First of all, the reaction is carried out in solution in an organic solvent, which is expensive and requires relatively large reaction volumes, and further, the reaction times required are relatively long, being in the order of a number of hours. Futhermore, the normally employed solvent, methyl ethyl ketone, is a relatively hazardous material, and the process involves the handling of hazardous wastes.

Another drawback of conventional processes lies in the limitation of the reactor size, because of the danger of uncontrolled mass-polymerization. These processes further require heavy investments in equipment, to allow for elevated operation pressure and tight conditions. Moreover, reactor's walls fauling (encrustation), lump formation and agitator's blocking also represent serious problems.

SUMMARY OF THE INVENTION

It has now been most surprisingly discovered, and this is an object of the invention, that it is possible to effect the thermal bulk polymerization of PBB-MA, without any solvent or catalyst, to yield a product having properties virtually indistinguishable from those of PBB-PA prepared according to the known art. Surprisingly, the process of the present invention requires very short reaction times, of the order of a few minutes. Additionally, none of the additives required in suspension polymerization, e.g., surfactants, are necessary.

It is therefore an object of the present invention to provide a process which obviates the aforesaid and other drawbacks of the process of the known art, and which is both quick and economic.

It is another object of the invention to provide a process which does not require either an expensive solvent or a catalyst, and which can be carried out both batchwise and continuously.

As will be apparent to a person skilled in the art, the absence of a catalyst is advantageous, because traces of catalyst in the polymer may lower its thermal stability. Thus, as a general rule, it is desirable to employ the lowest possible amounts of catalyst.

DETAILED DESCRIPTION

The process for the thermal bulk homopolymerization of pentabromobenzylester monoacrylate and the co-polymerization of pentabromobenzylester monoacrylate with compatible monomer(s), is characterized in that the monomer(s) is (are) brought to melting conditions and heated to a temperature comprised between 120° C. and 290° C., for a period of time comprised between about 0.5 minutes and about 30 minutes. According to a preferred embodiment of the invention, the polymerization is carried out in the substantial absence of catalyst or of any other additive. While the process of the invention does not require the presence of such additives, it will be understood by those skilled in the art that addition of any additives which does not adversely affect the polymerization process, is of course permissible. Thus, for instance, the addition of a catalysts might, in some instances, be advantageous, although, as said, not necessary in order to carry out the process of the invention. Accordingly, the process of the invention exploits the very quick polymerization obtainable through a thermal process, which affords industrially attractive production times.

Although the process of the invention can be carried out in the range of temperatures mentioned above, according to a preferred embodiment of the invention the temperature is kept between about 150° C. and about 250° C. In this temperature range optimal process conditions are obtained, since melting of the monomer is easily obtained, and solidification of the polymerization product does not take place. When operating in this temperatures range, the bulk reaction shall usually be effected during a period comprised between 30 seconds and 20 minutes.

It should be noted that the exact nature of the product of the polymerization of PBB-MA is not known. Different values have been obtained, from different sources, for the molecular weight of PBB-PA obtained by conventional processes. Recent studies, however, would seem to indicate that the product of the polymerization reaction of PBB-MA is an oligomer having a mean molecular weight of about 6,000. This result is in contrast with the data resulting from the said German patent application No. 25 27 802.

According to a preferred embodiment of the invention, the thermal polymerization is carried out in a plastic processing or compounding equipment, such as an extruder or an internal mixing apparatus of the Banbury type. When operating according to this embodiment of the invention, pentabromobenzylester monoacrylate is fed to a continuous apparatus having a positive temperature difference between the outlet and the inlet, care being taken to maintain the residence time of the material flowing through the extruder between 30 seconds and 15 minutes. An example of such continuous compounding apparatus is the so-called twin-screw extruder. Apparatus of this kind is known in the art, e.g., from French patent No. 1.562.038, which relates to the polymerization of methyl methacrylate, or for the modification of polymers (e.g., U.S. Pat. No. 3,953,655). The skilled engineer, therefore, will be able to devise appropriate conditions for carrying out the thermal polymerization of PBB-MA in continuous apparatus, according to the process described herein.

The polymerization product of pentabromobenzylester monoacrylate, or its copolymerization product with compatible monomers, whenever prepared by the process of the invention, also forms part of the present invention. Also encompassed by the invention are flame-retardant resin composition comprising a flame-retardant active ingredient prepared according to the process of the invention.

The invention furthermore embraces the preparation of copolymers of PBB-MA with monomers which are bulk-copolymerizable, as will be further detailed hereinafter.

The above and other characteristics and advantages of the invention will be better understood from the following illustrative and nonlimitative description of examples of polymerization runs.

EXAMPLE 1

An experiment was carried out in order to compare the thermal behavior of PBB-MA after polymerization, and PBB-PA. The PBB-PA employed was commercial material prepared according to the process of DE 25 27 802.

The experiments were carried out in a Plasti-Corder® PL E651 (Brabender OHG, Duisburg, W. Germany), at 40 rpm. The material was fed into the Plasti-Corder, heated to 200° C., and the value of the torque was recorded. Additional torque recordings were carried out at other temperatures. The results are given in Table I below. From the results of this experiment it can be seen that PBB-MA polymerized very quickly at 200° C. No difference between the thermal behavior of commercial PBB-PA and of the product of the thermal treatment of PBB-MA was observed.

EXAMPLE 2

PBB-MA was polymerized in a twin-screw compounder (Brabender DSK 4217), and the polymerization product was compared with commercially available PBB-PA (commercial FR 1025 sold by Eurobrom, Holland). Three polymerization runs were carried out, and the polymerization conditions were as follows:

| Exp. No. | screw velocity (RPM) | Profile Temp. [°C.] inlet | middle | outlet | RT[(1)] [min] | Torque [Nm] |
|---|---|---|---|---|---|---|
| 1 | 25 | 170 | 230 | 225 | 6–7 | 180–250 |
| 2 | 40 | 230 | 240 | 245 | ~2 | 100–130 |
| 3 | 30 | 170 | 200 | 230 | 4–5 | ~200 |

[(1)]Residence-time.

The parameters measured were as follows.

Molecular Weight: Estimated according to Gel Permeation Chromatography (GPC) against polystyrene. The molecular weight was in all cases about 2000–6000.

Thermal Gravimetric Analysis: TGA, effected at 300° C. during 30 minutes, and expressed as percent weight loss. the result was in all cases 9%.

Intrinsic Viscosity $(\eta_{sp}/C)_{c\rightarrow 0}$: measured at about 5% by weight concentration in bromobenzene, and at 100° C. The measured value was about 0.02.

EXAMPLE 3

A comparison was effected between commercial PBB-PA, and the PBB-PA of Example 2, prepared according to the invention by polymerizing PBB-MA at 225° C. in a twin-screw extruder, with a mean residence-time of 7 minutes. The two differently prepared materials were used in preparing a flame-retardant composition based on Nylon 6 Polycaprolactam (Capron 8200 MS, Allied Chemical Corp.) as the base polymer.

The compounding conditions were as follows:

1. Mixing in plastograph (Brabender) at 250° C., 50 rpm, for about 2–4 minutes. Cooling down to about 230° C. at 25 rpm. Total processing time: 7–10 minutes.
2. Pressplating in press at 250° C., 1 min. at 1 atm, 15 sec. at 100 atm, then cooling down to about 180° C.

Test results for these compositions are detailed in Table II below. As will be apparent to the man of the art, both materials exhibit comparable properties.

EXAMPLE 4

Example 3 was repeated, using also PBB-MA polymerized in bulk (in vitro polymerization). The performance of commercial PBB-PA was compared with that of PBB-MA polymerized in vitro and in a twin-screw extruder. The results are summarized in Table III below.

EXAMPLE 5

(A) Molar amounts of PBB-MA and of tribromophenylmaleimide were heated in a Plasticorder at 180° C. during 20 minutes. The reaction was monitored by HPLC. After this period of time 70% of the monomers had reacted to give the corresponding copolymer.

(B) The experiment described in (A) above was repeated, with the addition of 1% LUPEROX-130 as an initiator, and the monomer mixture was heated to 140° C. during 20 minutes, under which conditions full conversion was obtained.

The product had a TGA: 2%—283° C.; 5%—315° C.; 10%—320° C.

The above description and examples have been provided for the purpose of illustration, and are not intended to limit the scope thereof. Various different compounding and processing apparatus and conditions can be employed, and different additives can be used, or different plastic materials can be provided, which incorporate PBB-PA, all without exceeding the scope of the invention.

TABLE I

| Material | Torque [Nm] at given temperature [°C.] | | | | | | |
|---|---|---|---|---|---|---|---|
| | 200 | 190 | 180 | 170 | 160 | 150 | 200* |
| PBB-PA | 18 | 21 | 24 | 27 | 29 | 33 | 18 |
| PBB-MA | 19 | — | 24 | — | 30 | 32 | 18 |

*Preheated to 200° C. after cooling.

TABLE II

| Component (%) | Composition No. | | | |
|---|---|---|---|---|
| | 1 | 2 | 3 | 4 |
| Capron 8200 MS | 70.60 | 70.60 | 79.46 | 77.55 |
| Antimony Trioxide[(1)] | 6.9 | 6.9 | 4.76 | 5.24 |
| Hostaflon TF 9202 | 1.0 | 1.0 | 1.0 | 1.0 |
| Mg-Stearate | 0.5 | 0.5 | 0.5 | 0.5 |
| PBB-PA (Commercial) | 21.0 | — | 14.28 | — |
| PBB-PA of the invention | — | 21.0 | — | 15.71 |
| Br % | 15 | 15 | 10 | 11 |
| FLAMMABILITY UL 94 1.6 mm thickness: | | | | |
| Total Flaming Time (sec) | 15 | 8 | 33 | 19 |
| Max. Flaming Time (sec) | 3 | 1 | 8 | 8 |
| No. of specimens dripping and igniting cotton | none | none | none | none |
| Class | V-0 | V-0 | V-0 | V-0 |

[(1)]Campine Blue Star

TABLE III

| Resin Type | Parameter | Commercial PBB-PA | | | PBB-PA (Ex. 3) | | | PBB-PA (Ex. 4) | | |
|---|---|---|---|---|---|---|---|---|---|---|
| | | 0.8 mm | 1.6 mm | 3.2 mm | 0.8 mm | 1.6 mm | 3.2 mm | 0.8 mm | 1.6 mm | 3.2 mm |
| PET[4] | Min. Br[1], % | 7 | 6.5 | | | | | 8 | | |
| PETRA 130 | N.I.[2] [J/m] | 49 | | | | | | 45 | | |
| ex Allied | HDT[3] [°C.] | 162 | | | | | | 165 | | |
| PBT[4] | Min. Br, % | 8 | | 5 | 8 | | 5 | 7 | | 5 |
| VALOX 420 | N.I. [J/m] | 87 | | | 92 | | | 91 | | |
| ex Gen. Electr. | HDT, [°C.] | 198 | | | 202 | | | 201 | | |
| NYLON 6 | Min. Br, % | | 12 | | | 11 | | | 9 | |
| CAPRON 8200 | N.I. [J/m] | | | | | | | | | |
| HS, ex Allied | HDT, [°C.] | | | | | | | | | |
| ABS[4] | Min. Br, % | | 12 | | | | | | 11 | |
| RONFALIN | N.I. [J/m] | | 61 | | | | | | | |
| TZ, ex DSM ?? | HDT, [°C.] | | 85 | | | | | | | |
| HIPS[4] | Min. Br, % | | 14 | 10 | | | | | 14 | 10 |
| VESTRON 638 | N.I. [J/m] | | | | | | | | | |
| ex Huels | HDT, [°C.] | | | | | | | | | |

[1]Minimum Bromine Concentration to achieve the standard UL 94 V-0
[2]Izod Notched Impact
[3]Heat deflection temperature, measured at 264 psi.
[4]PET: Polyethyleneterephthalate
PBT: Polybuthyleneterephthalate
ABS: Acrylonitrile-butadiene-styrene
HIPS: High impact polystyrene

We claim:

1. A process for the thermal bulk homopolymerization of pentabromobenzylester monoacrylate and the co-polymerization of pentabromobenzylester monoacrylate with compatible monomer(s), wherein the monomer(s) is (are) brought to melting conditions and heated to a temperature comprised between 120° C. and 290° C., for a period of time comprised between about 0.5 minutes and about 30 minutes.

2. A process according to claim 1, wherein the temperature is kept between about 150° C. and about 250° C., for a period comprised between 30 seconds and 20 minutes.

3. A process according to claim 1 in which the monomer(s) is (are) fed to a continuous plastic processing apparatus having a positive temperature difference between its outlet and its inlet, wherein the residence time of the material flowing through the continuous plastic processing apparatus is comprised between 30 seconds and 20 minutes.

4. A process according to claim 3, wherein the continuous plastic processing apparatus is an extruder.

5. A process according to claim 4, wherein the extruder is a twin-screw extruder.

* * * * *